Figure 1:
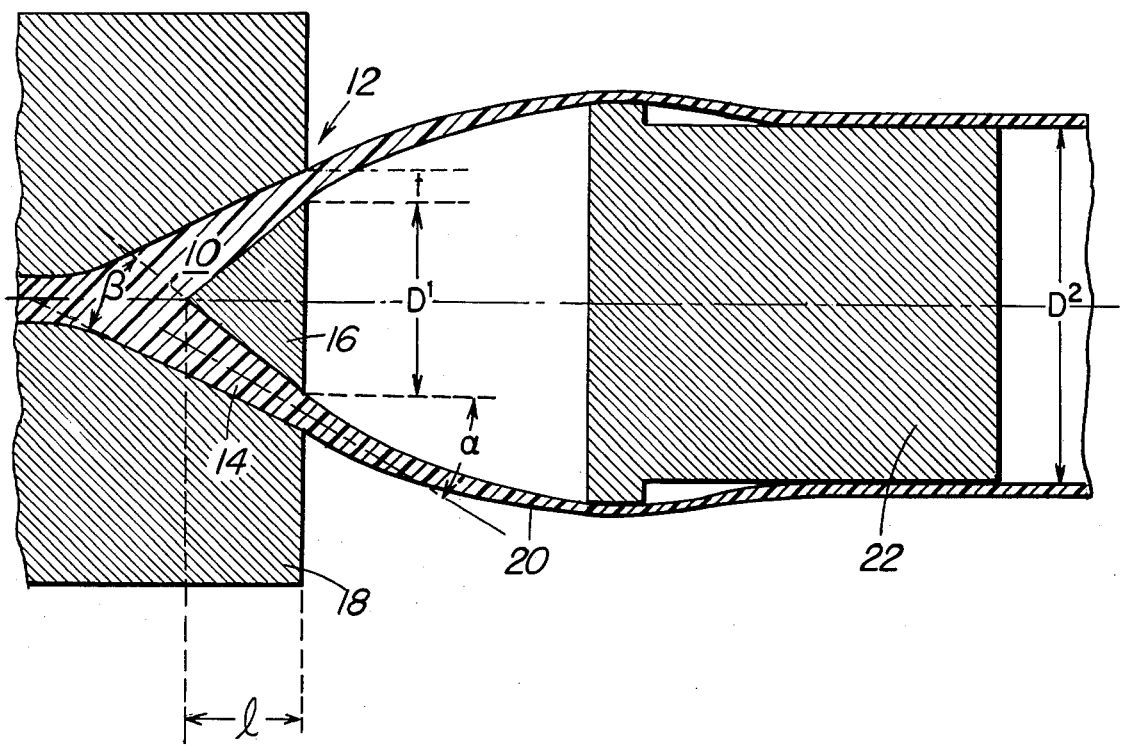

United States Patent [19]
Cavanna et al.

[11] 3,879,507
[45] Apr. 22, 1975

[54] METHOD OF PRODUCING A FOAM-FORM FLAT FILM OR SHEET HAVING A MORE BALANCED MACHINE AND TRAVERSE DIRECTION STRENGTH

[75] Inventors: Anthony John Cavanna, Pittsford; Edward Armando Colombo, Fairport, both of N.Y.

[73] Assignee: Mobil Oil Corporation, New York, N.Y.

[22] Filed: Feb. 26, 1973

[21] Appl. No.: 335,628

[52] U.S. Cl. ............... 264/51; 264/53; 264/146; 264/209; 264/210 R; 425/466; 425/817 C
[51] Int. Cl. ............... B29d 27/00; B29f 3/06
[58] Field of Search ........... 264/52, 53, 54, DIG. 8, 264/209, 210 R; 425/466, 817 C

[56] References Cited
UNITED STATES PATENTS

| | | | |
|---|---|---|---|
| 3,121,760 | 2/1964 | Kline | 264/51 |
| 3,121,911 | 2/1964 | Lightner | 264/53 X |
| 3,160,688 | 12/1964 | Aykanian | 264/53 |
| 3,194,864 | 7/1965 | Richie | 264/53 X |
| 3,311,681 | 3/1967 | Cherney et al. | 264/53 X |
| 3,327,038 | 6/1967 | Fox | 264/51 UX |
| 3,331,103 | 7/1967 | Fox | 264/53 UX |
| 3,385,917 | 5/1968 | Breukink et al. | 264/51 |
| 3,403,203 | 9/1968 | Schirmer | 264/51 |
| 3,488,746 | 1/1970 | Gilbert | 264/53 |
| 3,502,753 | 3/1970 | Rhoads | 264/51 |

OTHER PUBLICATIONS

Schulken, R. M. and R. E. Boy. "Cause of Melt Fracture, How it Is Related To Extrusion Behavior." in SPE Journal, April, 1960. pp. 423–428.
Dilley, E. R. "The Use of Chemical Blowing Agents in Direct Extrusion Expansion," in Trans. J. Plastics Inst., February 1966, pp. 17–21.
SPI Plastics Engineering Handbook, third edition. New York, Reinhold, c1960, page xliv.
Whittington, Lloyd R. "Whittington's Dictionary of Plastics," Stamford, Conn., Technomic, c1968, page 741.

*Primary Examiner*—Philip E. Anderson
*Attorney, Agent, or Firm*—C. A. Huggett; M. G. Gilman

[57] ABSTRACT

Improvements in the extrusion production of foam-form film or sheeting plastic products in order to balance the strength characteristics thereof without significantly varying other overall product characteristics, such as size, production rate and bulk density. These improvements are obtained by varying the configuration of the extrusion die so as to decrease the die gap, increasing the die land length and increasing the exit angle of the die with respect to the axis of the foam-form film or sheeting produced thereby.

7 Claims, 1 Drawing Figure

METHOD OF PRODUCING A FOAM-FORM FLAT FILM OR SHEET HAVING A MORE BALANCED MACHINE AND TRAVERSE DIRECTION STRENGTH

This invention relates to the production of thermoplastic foam. It more particularly refers to improvements in the production of thermoplastic foam-form film or sheeting.

It is known to extrude certain thermoplastic resins directly into foam-form film or sheeting by plastifying the resin, blending such with a suitable nucleating agent and blowing agent, and extruding this blend through an appropriate size die under such conditions as to form such extrudate into film or sheet form while foaming such. In one particular modification of this generally known process, the above-referred to blend is extruded through a circular (annular) die gap to produce a tubular foam-form film or sheeting extrudate This tubular extrudate is then passed over a forming mandrel having cooling fluid passing there-through. In this process it is common for the forming mandrel to have such a diameter as to necessitate the tubular film being stretched to fit over the mandrel.

After the tubular foam-form extrudate passes over the forming mandril and is cooled to a sufficient extent so that the foam form character thereof is substantially stable, the tube is conventionally slit in the longitudinal direction, spread flat and wound on a take-up roller means. It is known that the stretching of the tubular extrudate over the forming mandrel and/or the winding of the flattened foam-form material on the take up means causes the thus formed film or sheeting to have been oriented in the longitudinal and transverse directions.

The flat, oriented, foam-form film or sheeting is suited to use as a raw material for further operations such as thermoforming. Foam-form meat trays, egg cartons, disposable dishes and cups, and other similar articles are conventionally produced by subjecting foam-form film or sheeting to thermoforming with appropriate shaped molds under suitable conditions.

In the meat tray field, the tray is used as a carrier for meat, usually in supermarkets. In use, the butcher or wrapper places the cut or chopped meat on the tray, wraps it in clear thermoplastic film, heat seals the film to itself around the tray and meat and then puts the package in the counter for customer inspection and purchase. The wrapping of the tray supported meat is accomplished in such a manner as to cause the clear thermoplastic film to tightly press against the meat and tightly hold the meat against the foam-form tray. This gives the meat a shiny and attractive appearance and makes for a total package which is dimensionally and appearance stable not only when it is placed in the counter but also after it has been picked over by many shoppers. A tight package also aids the checkout personnel to quickly find the price and ring it on the cash register.

The clear plastic film overwrap exerts a significant force on the meat tray, tending to force toward each other at least those edges thereof about which the film is initially wrapped. It sometimes happens that the clear film is wrapped so tightly that it actually buckles the foam-form meat tray. This condition is aggravated when the compression and flexural strength of the foam-form tray is significantly different in the longitudinal and transverse directions. When these conditions exist, the tray edges parallel to the direction of greatest strength are the ones that tend to collapse due to tension exerted by the overwrap. In actual practice it has been found that conventional foam-form film or sheeting production as outlined above produces product which has been stretch oriented to a greater extent in the machine direction than in the transverse direction; often-times as much as half again as much.

The obvious answer to this situation is to either draw the foam-form extrudate away from the extruder at a slower rate, thereby reducing machine direction orientation, or increasing the diameter of the forming mandrel, thereby increasing the transverse direction orientation. while either or both of these modifications will apparently solve the problem of producing foam-form film or sheeting with balanced orientation, orientation, both also create additional problems of such magnitude as to override the benefit of balancing orientation. If one reduces the take off rate, and thereby reduces machine direction orientation, one simultaneously increases the foam-form film gauge thereby decreasing the density thereof. This decrease in density results in a different product (with respect to one desired) when the foam sheet is then subjected to thermoforming to produce a final product. If one increases the diameter of the forming mandrel and thereby increases transverse direction orientation, one changes the width of the final foam-form product produced which in turn necessitates changing all of the downstream thermoforming equipment sizes and production techniques, which is also economically detrimental to the overall process.

It is therefore an object of this invention to provide a novel process for producing thermoplastic foam-form film or sheeting having substantially balanced strength properties in the machine and transverse directions.

It is another object of this invention to provide such a novel process which does not significantly vary production rates, or size of product with respect to prior art process.

Other and additional objects of this invention will become apparent from a consideration of this entire specification including the drawing and the claims hereto.

Understanding of this invention will be facilitated by reference to the accompanying drawing in which FIG. 1 is a longitudinal section through an extrusion die particularly well suited to use in this invention.

In considering this invention, it is important to note that its applicability is specifically directed to those situations where it is desired to vary the ratio of machine direction and transverse direction orientations (and therefore their relative strengths in these directions) while maintaining other product properties and size and process throughputs the same. This is not to say that the benefits of this invention will not apply where other process or product parameters are varied. These other process and product parameters can of course be varied for whatever purpose is desired but they need not be varied to accomplish the purposes of this invention.

In accord with and fulfillng these objects, one aspect of this invention resides in the discovery that there is a proportional relationship between die gap in an annular die and machine direction orientation. More particularly, in a process of producing foam-form film or sheeting of thermoplastic material where a foamable, extrudable composition comprising a thermoplastic resin is extruded through an annular die of given nominal diameter, and taken off at a given rate so as to produce a foam-form tubular product of given diameter, thickness and bulk density; the practice of this invention dictates that a reduction in the thickness of the die gap of the annular die will result in the production of a foam-form tubular product of the same bulk density and diameter and at the same throughput rate as without decreasing the die gap but which product has a reduced machine direction orientation as compared to such prior produced product.

It will be clear that placing numerical values on the variation of die gap geometry in the manner set forth above would be unduly limiting in that the actual die gap is a function of the desired final foam-form product thickness as well as many other factors in addition to those of critical interest in this invention. Put another way, if one of ordinary skill in the art were to determine the proper die geometry and size, and process throughput rate to produce a given foam-form product, the strength characteristics of the product are subject to modification according to this invention as a function of additional modifications in the die gap as aforesaid.

Foamable thermoplastic resins are generally known in the art. These are exemplified by thermoplastic polyurethanes, polyvinyl chlorides and polystyrenes. Of particular interest in this invention is polystyrene. It is known to foam thermoplastic resins by means of blowing agents which decompose to form a gas byproduct, usually carbon dioxide, or alternatively to cause foaming by the pressure relief vaporizaiton of relatively low boiling materials which had been kept under pressure in liquid admixture with the resin. In this regard there is particular interest in this invention in using vaporizing pentane as the blowing agent. As the resin composition passes through the extrusion die from high pressure conditions inside the extruder to ambient, low pressure conditions outside the extruder, the dissolved and/or blended liquid pentane in the extruded resin suddenly vaporizes to foam the resin. A conventional nucleating agent is incorporated in the blend to cause foam cell formation. If the resin is polystyrene, the density of the resin blend in the extruder just before it passes through the die is about 65 pounds per cubic foot. The foam produced therefrom has a lower bulk density; how much lower depends upon the amount of foaming and nucleating agent used and the conditions of foaming. It is common in producing polystyrene foam for use in meat trays and egg cartons and the like for the foam to have a bulk density of about 3 to 6 pounds per cubic foot, preferably about 4 ½ pounds per cubic foot.

A further embodiment of this invention which has been found to be particularly useful, not only in helping to regulate the relationship between machine and transverse direction orientation, but in aiding the process operator in starting up, is to diverge the exit angle of the foam-form film from the die lip.

As applied to this particular type of system, that is polystyrene tubular extrusion foamed with vaporizing pentane, there are certain numerical relationships which are believed to be applicable. If the ratio of machine direction orientation to transverse direction orientation is about 0.85 to 1.15 and if the ratio of average final tube diameter to average die diameter is about 4.5 to 6 and if the product bulk density is about 3 to 6 pounds per cubic foot, the angle $\alpha$ of divergence of the die lip to the tubular extrudate axis should be about 20° to 45°. Further, under these conditions, the ratio of the final foam thickness to die gap should be about 4 to 7. This latter value compares to a ratio of final foam thickness to die gap as practiced by the prior art of about 2.5 to 3.0.

Under certain circumstances, related to speed of passage of polymer through the extrusion die, reducing the die gap while attempting to maintain a given weight throughput will sometimes, if the throughput is high enough, cause "melt fracture." This phenomenon caused by the flow of non-newtonian fluids under the conditions expressed. If the specific combination of the throughput required of the process and the die gap reduction required of this invention causes the polymer passing through the die to "melt fracture," it has been discovered that this condition can be rectified by increasing the length of the die land and/or slightly tapering (narrowing) the die gap. In the preferred aspect of this invention generally described above, that is, using a polystyrene resin and operating under the prescribed conditions, melt fracture can be avoided by tapering the annular die about 1° to 5°, preferably about 3°, and increasing the die land length by a factor of about 2 to 10, preferably about 4. It is believed that amelioration of the melt fracture problem is a function of both of these parameters and therefore they must be considered in combination with each other, that is, a greater tapering combined with a lesser increase of die land length will give equivalent results.

In defining a complete, improved process of producing a foam-form film of a given base resin according to this invention, one must therefore take into account the annular die gap, the angle of emergence (divergence) of the annular polymer stream being extruded, the length of the annular die land and the taper of the annular die gap. All of these factors must be related to the fixed operating parameters (desirata) of throughput rate, size of product and bulk density of product. It should be appreciated that the last two referred to variable factors are secondary dependent variables in that they cannot be determined until the first two (die geometry) factors have been established. These first two variable factors are primary dependent variable in that they cannot be determined independent of the above-referred to fixed operating parameters.

The die gap referred to herein is measured at the outward end of the extrusion die. The die taper can be accomplished by holding either side of the annular die fixed (parallel to the die gap center line) and cant the other side, or both sides can be canted forward each other to provide the required taper.

Referring now to the drawing, a polymer resin foamable composition 10 is plastified and fed from an extruder (not shown) into an annular die 12 composed of an annular channel 14 of diameter $D^1$ defined by a center member 16 and an external ring member 18. The polymer 10 issues from the annular die 12 in the form of a foam form tube 20 which passes about a forming mandrel 22 which along with windup roller means (not shown) define the final size $D^2$ of the foam tube. According to this invention, the angle of emergence of the foam form polymer tube X is greater than in the prior art, while the die gap $t$ is less than the prior art for the same die diameter $D^1$, product diameter $D^2$, throughput rate and product bulk density. In the event that melt fracture becomes a problem under these operating condtions, the land *l* is increased as compared to the prior art and/or the die gap taper anble $\beta$ is increased as compared to the prior art in order to overcome this problem.

In one specific embodiment of this invention, the die has the following dimensions:

| | |
|---|---|
| angle of divergence | = 30° |
| angle of die taper | = 3° |
| length of die land | = 0.125 inch |
| die gap at exit | = 0.025 inch |
| die diameter (nominal) | = 2.5 inch |
| blow up ratio | = 5/1 |

What is claimed is:

1. In the process of producing foam-form thermoplastic film or sheeting by extruding a foamable composition comprising a thermoplastic resin and a foaming agent through an annular die of given diameter, gap thickness and die gap angle of divergence from its axis to form a tubular, foam form thermoplastic extrudate of given diameter; drawing said tubular extrudate over a forming mandrel of given diameter larger than the diameter of said die and said extrudate tube; slitting said tubular extrudate, after drawing such over said forming mandrel, to produce a flat film or sheet of said foam extrudate of given width; and taking up said flat extrudate at a given linear speed so as to produce as a product, a flat, biaxially oriented foam-form film or sheet of said given width, a given bulk density, and given machine and transverse direction strengths; the improvement, whereby a foam-form flat film or sheet of said given width and bulk density is producecd with more balanced machine and transverse direction strength, which comprises reducing said die gap thickness, increasing said die gap angle of divergence and extruding said composition through said annular die having said smaller die gap thickness than said given die gap thickness and having a larger die gap angle of divergence than said given die gap angle of divergence.

2. The improved process claimed in claim 1 wherein said die gap angle of emergence is about 20° to 45 ° degrees.

3. The improved process claimed in claim 1 wherien the ratio of final foam thickness to die gap thickness is about 4 to 7.

4. The improved process claimed in claim 1 wherein said thermoplastic is polystyrene, said foaming agent is pentane and the ratio of the diameter of the drawn foam form tubular film to the nominal diameter of the extrusion die is about 4.5 to 6.

5. The improved process claimed in claim 1 including tapering the die gap about 1° to 5° in the direction of extrusion.

6. The improved process claimed in claim 5 including increasing the length of the land of the extrusion die.

7. The improved process claimed in claim 6 wherein said die land length is increased by a factor of about 2 to 10.

* * * * *

UNITED STATES PATENT AND TRADEMARK OFFICE
CERTIFICATE OF CORRECTION

PATENT NO. : 3,879,507
DATED : April 22, 1975
INVENTOR(S) : ANTHONY JOHN CAVANNA and EDWARD ARMANDO COLOMBO It is certified that error appears in the above-identified patent and that said Letters Patent are hereby corrected as shown below:

| | |
|---|---|
| Column 2, line 16 | After "orientation" delete "orientation" |
| Column 4, line 11 | After "this" insert --a-- |

Signed and Sealed this thirtieth Day of September 1975

[SEAL]

Attest:

RUTH C. MASON
Attesting Officer

C. MARSHALL DANN
Commissioner of Patents and Trademarks